United States Patent [19]

Tseng

[11] 4,145,619
[45] Mar. 20, 1979

[54] TWO WIRE CAPACITANCE TRANSMITTER
[75] Inventor: James W. Tseng, La Palma, Calif.
[73] Assignee: Robertshaw Controls Company, Richmond, Va.
[21] Appl. No.: 747,403
[22] Filed: Dec. 3, 1976
[51] Int. Cl.$^2$ .............................. H01H 35/18
[52] U.S. Cl. .................................. 307/118; 340/620
[58] Field of Search ............... 307/116, 118, 125; 361/178, 179, 181; 340/244 C, 248 A; 324/61 P, 60 C, 60 R; 73/304 C

[56] References Cited
U.S. PATENT DOCUMENTS

| | | | |
|---|---|---|---|
| 3,482,234 | 12/1969 | Doniger et al. | 340/248 A |
| 3,530,379 | 9/1970 | Demerliac | 324/60 R |
| 3,543,046 | 11/1970 | Tiffany | 307/118 |
| 3,555,534 | 1/1971 | Akers et al. | 307/116 |
| 3,612,997 | 10/1971 | Paulkovich | 324/60 C |
| 3,811,051 | 5/1974 | Merrell | 307/118 |
| 3,829,850 | 8/1974 | Guetersloh | 361/181 |

Primary Examiner—Robert K. Schaefer
Assistant Examiner—Eugene S. Indyk
Attorney, Agent, or Firm—Fulwider, Patton, Rieber, Lee & Utecht

[57] ABSTRACT

There is disclosed a capacitance transmitter that is ideally suited for use with a capacitance probe for level, pressure or proximity measurement in which the capacitance of the probe member responds to the sensed physical parameter. The transmitter has only two conductors which furnish the operational voltage and which transmit the output current signal. The transmitter includes a constant base current generator that produces a minimum base current through the two connectors, an oscillator to develop a train of square-wave voltage signals, a multivibrator circuit receiving the square-wave voltage signals and cyclicly applying controlled currents in response thereto to the probe capacitor and to a reference capacitor; a charge rate discriminating circuit receiving charging rate signals from each of the probe and reference capacitors and developing an output current responsive to differences thereof, a feedback circuit from the output of the discriminating circuit to the multivibrator circuit to increase the charging rate of the probe capacitor in response to the output current and a summation circuit receiving the constant base current and the discriminating circuit output current to provide a current signal proportional to the capacitance value of the probe capacitance. Adjustable components are provided in each of the controlled current circuits to permit the fixed adjustability of the zero and the span of the instrument. A transient supression network circuit can also be provided to protect the transmitter.

7 Claims, 4 Drawing Figures

TWO WIRE CAPACITANCE TRANSMITTER

BACKGROUND OF THE INVENTION

1. Field of the Invention

This invention relates to a capacitance-to-current transmitter and, in particular, to a capacitance transmitter useful with capacitance probes used to measure process variables such as level, pressure or proximity.

2. Brief Description of the Prior Art

Capacitance-to-current transmitters have been used for many years for detection of changes in process variables such as the pressure of gases, the level of liquids and solids or the proximity of a body. Usually the transmitters are employed with a probe of a rigid, rod-shaped electrode which, depending on its application, may be covered with dielectric insulation. The capacitance between the probe and a grounded terminal varies in response to the environment surrounding the probe, e.g., the capacitance changes as the liquid level rises in a vessel, immersing an increasing length of the electrode probe.

Some of the prior capacitance transmitter circuits have included the variable capacitance in a oscillating circuit whereby the output frequency is a function of the variable capacitance. Typical of these are the circuits described in U.S. Pat. Nos. 3,518,537 and 3,896,374. Other circuits have used comparator means for determining the differences between the charging rates of reference and variable capacitors and developing an output signal in response to the differences. Typical of these transmitters are those described in U.S. Pat. Nos. 3,487,300; 3,811,051 and Re 27,829.

All of the aforedescribed capacitance transmitters have, heretofore, employed at least several connecting leads to apply the operational voltage and to transmit the output signal therefrom. Additionally, the input voltage to the circuits is often a relatively high voltage, incurring unnecessarily high maintanence since the probes are often employed in contact with corrosive and/or highly conductive liquids. Conventional capacitance probes also tend to become coated with a conductive layer during use which destroys their precision and requires frequent cleaning for reliable measurement.

BRIEF DESCRIPTION OF THE INVENTION

This invention comprises a capacitance-to-current transmitter having only two wires for the supply of a low voltage, operational current source and for transmitting a capacitance value signal therefrom. The transmitter includes first and second conductors which are connected to a remote, low voltage supply, a controlled current generator in circuit therewith a provide a constant, base current therethrough, a multivibrator circuit for cyclic application of controlled currents to the probe capacitor and to a reference capacitor, a capacitor charge rate discriminating circuit which receives at its input terminals, the charging rate signals from the probe and reference capacitors and develops an output current responsive to differences therein, a feedback circuit from the discriminating circuit to the multivibrator circuit to increase the charge rate of the probe capacitor in response to the discriminating circuit output current and a summation circuit receiving the constant, circuit base current and the discriminating circuit output current. The transmitter also includes an oscillator circuit to develop a train of square wave voltages for operation of the multivibrator circuit. The controlled current supplies to each of the capacitors is achieved by constant current regulator circuits which, preferably, include adjustable components whereby the zero setting and the span of the instrument are fixedly adjustable. The transmitter can also include a transient supression circuit to prevent the application of damaging and spurious voltages in the voltage supply.

BRIEF DESCRIPTION OF THE DRAWINGS

The invention will be described by reference to the figures to which.

DESCRIPTION OF PREFERRED EMBODIMENTS

Figure 1:
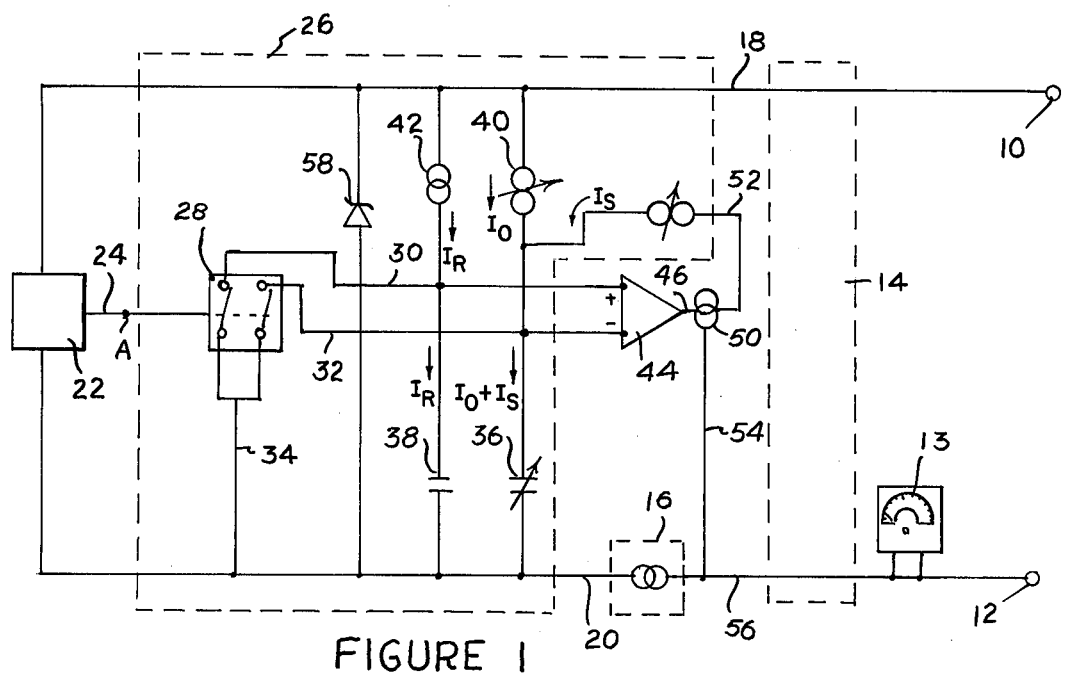
FIG. 1 is a schematic block diagram of the transmitter.
Figure 2:
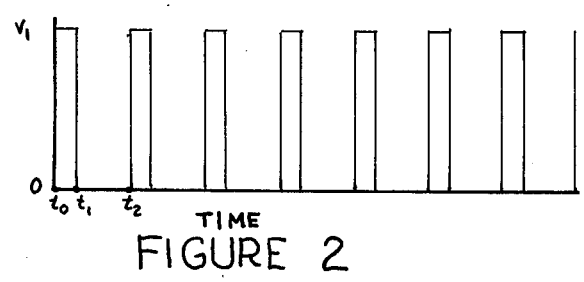
FIGS. 2 and 3 illustrate wave forms developed at points A and B, respectively, shown on FIG. 1.

Referring to FIG. 1, the transmitter is shown as provided with two connecting terminals 10 and 12 for the application of the supply voltage thereto and for detection of the output signal therefrom at ammeter 13. The transmitter, preferably, includes a transient supression circuit 14 shown by the phantomed lines. A constant current generating circuit 16 is provided in circuit with the first and second conductors 18 and 20 to provide a constant, base current flow therethrough. Conductors 18 and 20 supply operation voltage to an oscillator circuit 22 which has a square wave output such as shown in FIG. 2 wherein the output voltage varies from a base line voltage, e.g., 0 volts to value $V_1$. Preferably, the train of square wave voltage pulses is not symmetrical and the duration of the base voltage, $T_1$ to $T_2$, is substantially greater than the cycle time for the supply of voltage $V_1$, $T_0$ to $T_1$.

The oscillator output is applied through conductor 24 to a multivibrator circuit shown within the phantomed box 26. The multivibrator circuit includes a double pole, single throw switch means 28 that receives the oscillator output signal and responds thereto by grounding leads 30 and 32 through conductor 34 during the high voltage portion ($V_1$) of the oscillator signal shown in FIG. 2.

The variable capacitor of the instrument probe is shown as circuit element 36 in the multivibrator circuit. Also included is a reference capacitor 38. Each of capacitors 36 and 38 is supplied with a controlled charging current through controlled current circuits 40 and 42, respectively. The current to capacitor 38 is shown as $I_R$ and the current to capacitor 36 is shown as $I_O + I_S$, which is the sum of the current ($I_O$) supplied by controlled current circuit 40 and the current ($I_S$) supplied by feedback circuit 52. The application of a constant charging current to the reference capacitor results in a typical sawtooth wave form shown in FIG. 3. The slope or incline of the wave form is a function of the capacitor value and magnitude of the charging current. The capacitors are discharged by the closing of the switch means 28, thereby developing the cyclic and precisely repetitious sawtooth wave form shown in FIG. 3.

The capacitance value of the capacitor means 36 in the instrument probe is, of course, a variable which is responsive to the physical condition under investigation, e.g., liquid level, pressure, proximity, etc. As this value departs from the capacitance value of the reference capacitor, a difference in charge rate will be observed across its terminals and its difference in charge rate, relative to that of the reference capacitor is detected by the discriminating circuit means 44. The latter can be a convention, integrated circuit differential amplifier as described in greater detail hereinafter.

The discriminator circuit 44 develops an output current at lead 46 which is responsive to the difference in charging rate of capacitors 36 and 38. This output signal is amplified through current control circuit 50, developing a feedback current which is returned through feedback circuit 52 to the charging terminal of capacitor means 36 whereby the charging rate of capacitor means 36 closely tracks that of reference capacitor 38. The output of the controlled current circuit 50 is passed through summation circuit 54 to conductor 56 extending to terminal 12.

The transmitter circuit also includes a constant voltage regulation circuit 58 which includes a Zenner diode to maintain a constant voltage between conductors 18 and 20. The controlled current circuit 40 can include adjustable means as one or more of its circuit components whereby the current supplied to the probe capacitor means 36 can be fixedly adjusted, thereby providing adjustment capability for setting of the zero reading of meter 13. The span or range of the instrument, corresponding to the full deflection of the needle of meter 13 can be fixedly adjusted by the adjustment means in one or more of the components in the feedback circuit 52.

The circuit as thus described has only two terminals, 10 and 12, for the attachemnt of a low voltage power supply and the recording or indicating means such as meter 13 to determine the magnitude of the output current signal which is proportional to the variation in capacity of capacitor means 36 in the sensing probe.

Figure 4:
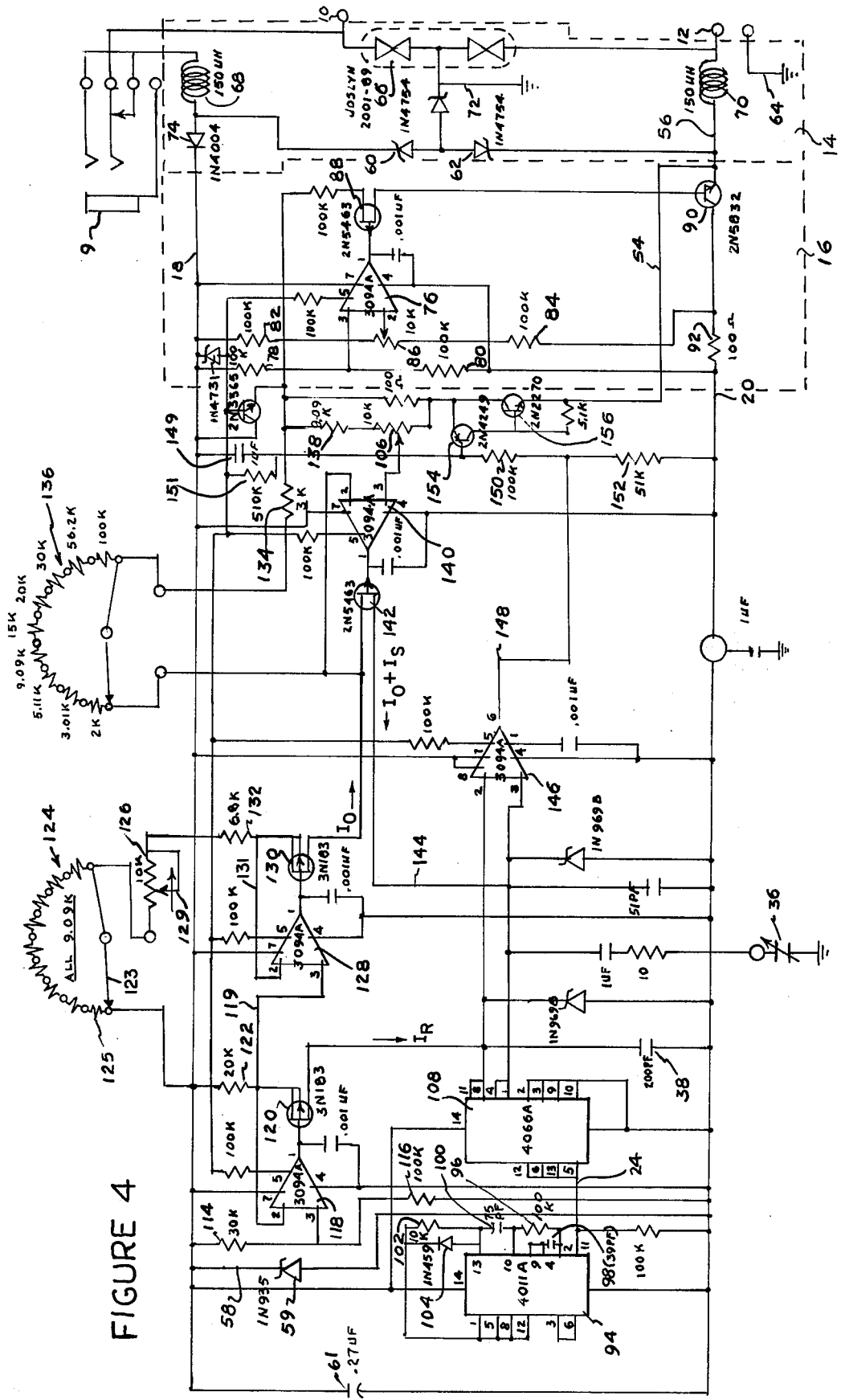
FIG. 4 is the circuit diagram of the transmitter.

Referring now to FIG. 4, the circuit will be described in detailed reference to the individual components. As illustrated, the circuit can include a conventional connector jack 9 for receiving a bayonet connector to permit use of portable test equipment useful for field calibration. The optional transient supression network 14 of the instrument includes Zenner diodes 60 and 62 to limit the voltage across conductors 18 and 56 and between each of these conductors and the ground terminal 64 to a nominal protective voltage, e.g., about 39 volts D.C. Lightening protector 66 which comprises opposed pairs of diodes, conducts between preselected voltages, e.g., between about 150 to about 200 volts D.C. Any voltage transients appearing between terminals 10 and 12 are filtered by coils 68 and 70, causing lightening protector 66 to conduct and discharge spurious voltage signals to ground through conductor 72. Diode 74 in conductor 18 protects against an accidental reverse polarity connection, protecting the circuit against inadvertent damage.

The constant current generator circuit 16 which provides the constant base current of the circuit is shown within the phantomed block 16. This current generator circuit develops a constant base circuit current of a value that will insure a precise meter response at its zero or null deflection point, e.g., about 2 to 10, preferably about 4 milliampheres. This base current is the total current which biases and operate the circuit.

As previously mentioned, a voltage regulation circuit 58 is included between the conductors 18 and 20 and this regulation circuit includes Zenner diode 59 that provides a reference voltage of a preselected value, e.g., about 9 volts. The circuit can also include a bypass capacitor 61 to reduce the A.C. impedance for the 9 volt supply voltage. The base current is maintained constant by an integrated circuit differential amplifier 76 which receives a reference voltage at its non-inverting terminal from the voltage divider formed of resistors 78 and 80. Another voltage divider, formed of resistors 82 and 84 and variable resistance potentiometer 86, provides the voltage input to the inverting terminal of amplifier 76. Any differences between these input voltages will cause amplifier 76 to drive field effect transistor 88 which, in turn, causes transistor 90 to conduct, increasing the current flow through resistor 92. The voltage across resistor 92 is fed back through the voltage divider of resistors 82, 84 and 86 to the inverting terminal of amplifier 76 so the current through resistor 92 will be stabilized when the error voltage between the input terminals of amplifier 76 is reduced to zero. The final adjustment of current flow through the conductor 20 and resistance 92 can be adjusted by the variable potentiometer 86 to a preselected value, e.g., about 4 milliamperes.

The transmitter is supplied with a train of square wave voltage pulses whose frequency is controlled by oscillator 94. The oscillator 94 is a CMOS oscillator of a conventional and commercially available integrated circuit. Briefly, the oscillator is a quad nand gate. The first three gates, resistor 96 and capacitor 98 form a simple logic oscillatory. Capacitor 100 and resistor 102 differentiate the output wave form from the oscillator. Diode 104 limits the differential wave form to a single half wave so that the output at pin 11 is a train of voltage pulses with a period the same as the oscillator and a pulse width which is controlled by the values of resistor 102 and capacitor 100. The cycle frequency of the oscillator is preferably from 100 to about 125 kilo-cycles per second and the pulse width $T_0$ to $T_1$ is less than half and, preferably from 2 to about 10 percent of the cycle. It has been found that these ranges of frequency and pulse time are highly beneficial since they favorably reduce the tendency of the capacitance probe to become coated and respond in a anomolous manner.

The train of voltages pulses produced by the oscillator 94 is applied through conductor 24 to a CMOS switch 108 in the multivibrator circuit. The multivibrator circuit includes a reference current generator, an adjustable zero current generator, an adjustable span current generator controlled by a feedback signal, the CMOS switch 108, the reference capacitor 38 and the probe, or variable capacitor 36.

The reference current generator, which produces a controlled, constant current, includes the voltage divider formed of resistors 114 and 116 that provide a reference voltage input to the number 3 terminal of the integrated circuit differential amplifier 118. The output terminal of amplifier 118 is connected to the gate terminal of transistor 120 which supplies current through resistor 122 to the reference capacitor 38. A feedback conductor 119 extends to the number 2 terminal of amplifier 118 whereby this amplifier maintains a constant current supply IR to capacitor. 38.

The adjustable circuit for permitting the fixed adjustability of the zero deflection point of meter 13 comprises a fixed position reostat circuit 124, potentiometer 126, integrated circuit differential amplifier 128, transistor 130 and resistor 132. The multiple-position reostat circuit 124 comprises a circular, multiple-contact switch having a plurality of resistors 125 of equal resistance connected between its successive terminals and having the wiper terminal shorted to the last switch contact by lead 127, whereby the swtich functions as a reostat. The integrated circuit differential amplifier 128 and transistor 130 are connected with feedback conductor 131 which extends to the number 2 terminal of amplifier 128 whereby this amplifier maintains a constant current supply $I_O$ in conductor 143.

The meter span or range adjustment circuit comprises resistor 134, reostat circuit 136, potentiometer 106, resistor 138, integrated circuit differential amplifier 140 and transistor 142. This span or range adjustment circuit is included in the feedback circuit from the capacitor charge rate discriminator circuit described hereinafter. The transistor 142 of the span adjustment circuit is in circuit with transistor 130 of the zero adjustment circuit to provide a charging current $I_O + I_S$ through conductor 144 to the variable probe capacitor 36.

The charge rate discriminator circuit comprises integrated circuit differential amplifier 146 having its input terminals connected to the charging reference capacitor 38 and variable probe capacitor 36 of the multivibrator circuit. The output of the differential amplifier 146 is connected to a voltage divider circuit of resistors 150 and 152 which provide the bias voltage for the operation of a pair of transistors 154 and 156 which develop an output current flow through conductor 58 in proportion to the error signal developed in the differential amplifier 146 of the discriminator circuit. The feedback signal is derived from potentiometer 106 and applied to the number 3 terminal of differential amplifier 140.

The operation of the circuit is apparent from the foregoing description. Briefly, the oscillator functions to provide a train of voltage pulses of short duration which is applied to the double-pole, single-throw, solid-state switch 108, grounding the capacitors with each positive voltage pulse to thereby permit the cyclic charging of the capacitors 36 and 38 during the time intervals ($T_1$-$T_2$) between the voltage pulses. As previously mentioned, it is preferred that the time intervals between pulses be longer than the time interval of each voltage pulse to provide a wave form such as illustrated in FIG. 2.

Figure 3:
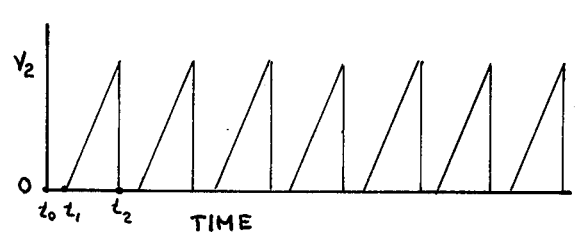

The reference capacitor 38 is supplied with a charging voltage of constant current, thereby developing a sawtooth wave form such as typically illustrated in FIG. 3 wherein each sawtooth segment is identical in shape and size.

The variable probe capacitor 36 is supplied with a charging voltage of a fixedly adjustable current flow. This current flow is adjustable by the movement of wiper 123 of reostat circuit 124 to preselect any number of a plurality of resistances 125. Since the voltage at point A is a constant, regulated voltage, the current flow through transistor 130 is fixedly adjustable by the preselection of resistances 125. This provides a controllable current supply $I_O$ to probe capacitor 36 whereby the zero or null deflection point of the meter 13 can be fixedly adjusted. A fine tuning of the zero position is achieved by the fixed adjustability of wiper 129 of potentiometer 126. The current supplied to the variable probe capacitor 36 is also fixedly adjustable by reostat circuit 136 which is substantially identical to circuit 124 previously described. Preselection of the resistance of reostat circuit 136 provides fixed adjustability in the current $I_S$ through this circuit whereby the span or range of deflection of meter 13 can be fixedly adjusted. Increasing the resistance of circuit 136 decreases current $I_S$. Since this decreases the total available current to charge probe capacitor 36 within the set charge time ($t_2-t_1$) it thus decreases the span or range of the meter 13. The charging current for capacitor 36 is supplied through conductor 144 which includes, in circuit, transistors 142 and 130 to provide a charging current of controlled magnitude.

The variation of the probe capacitor 36 results in a change in the charging rate of the capacitor, causing a difference in voltages applied to the 2 and 3 terminals of differential amplifier 146. If the charging rate of variable probe capacitor 36 is less than that of the reference capacitor 38, the output of differential amplifier 146 and the base of transistor 154 are driven to the voltage of conductor 20, through the filter network of resistor 150, capacitor 149 and resistor 151 and output transistor 156, to increase the output current flowing through conductor 54.

The feedback signal, which is derived from pheostat 136, is applied to differential amplifier 140, causing transistor 142 to conduct and increase the charging rate to the variable probe capacitor 36 through the span adjustment circuit. The feedback loop becomes stabilized when the charging rate of variable probe capacitor 36 is equal to the charging rate of reference probe 38, with the voltage across the terminals of the capacitors following the sawtooth wave form configuration shown in FIG. 3.

The output current from the discriminator circuit is applied through conductor 54 to the conductor 56 leading to terminal 12 of the transmitter circuit whereby this terminal receives the constant, transmitter circuit current determined by current regulator circuit 16 and the output current flow from the discriminator circuit network to provide a net or total current flow that is proportional to the change in capacitance value of the variable probe capacitor 36.

The resultant circuit offers the advantage of requiring only a two wire lead for connection to a remote power source and an indicating or recording instrument. Ease of installation, safety and simplicity of operation are thereby secured by this capacitance current transmitter. A very significant advantage of the invention is that it provides an improved anticoating characteristic when compared to various prior devices. Tests are shown that when the capacitor probe becomes coated with a conductive material the percentage error in the output signal from the invention transmitter is significantly less than that of prior transmitters. It is believed that this results from the high frequency and short pulse width of the oscillator circuit signal.

The invention has been described with reference to the presently illustrated and preferred embodiment. It is not intended that the invention be unduly limited by the illustrated and preferred embodiment. Instead, it is intended that the invention be defined by the means, and their obvious equivalents, set forth in the following claims.

What is claimed is:

1. A capacitance transmitter to develop an output current porportional to a sensed value of capacitance of a probe member which comprises:
   first and second conductors;
   base current generator means in circuit therewith to provide a constant, base current flow therethrough;
   multivibrator circuit means including probe capacitance means and reference capacitance means;
   first and second current control circuit means to apply charging currents of controlled magnitude to each of said capacitance means and switch means to cyclically and simultaneously ground both said capacitance means, discharging voltages developed thereon;

oscillator means to produce a train of square wave voltage pulses of predetermined constant time duration separated by intervals of a second, predetermined constant time operatively connected to said switch means to provide, in a cyclic fashion, a charging period of predetermined constant time duration separated by a discharging period of a second, predetermined, lesser and constant time interval;

capacitance charge rate discriminating means receiving charging rate signals from said probe capacitance means and said reference capacitance means and developing an output current responsive to differences in said charging rate signals;

feedback circuit means from said charge rate discriminating means to said multivibrator circuit means to vary the current to said probe capacitance means proportionally in response to said output current and thereby maintain a constant charge rate on both said capacitors; and summation circuit means receiving said circuit constant base current and said discriminating means output current.

2. The capacitance transmitter of claim 1 including a transient voltage supression circuit across said first and second conductors to reject spurious voltage signals.

3. The capacitance transmitter of claim 1 wherein said multivibrator circuit means includes a zero adjustment circuit receiving a constant voltage supply with adjustable resistance means in circuit therewith to provide fixed adjustable resistance of said circuit whereby the magnitude of charging current to said probe capacitance means may be fixedly adjusted.

4. The capacitance transmitter of claim 3 wherein said zero adjustment circuit includes first and second adjustable resistance means to provide coarse and fine adjustment.

5. The capacitance transmitter of claim 1 including in said multivibrator circuit means a span adjustable circuit receiving a constant voltage supply with adjustable resistance means in circuit therewith to provide fixed adjustable resistance of said circuit for the fixed adjustability of feedback current to said variable probe capacitance means.

6. The capacitance transmitter of claim 5 wherein said span adjustment circuit includes first and second adjustable resistance means to provide coarse and fine adjustment.

7. The capacitance transmitter of claim 1 wherein the duration of discharge time is from 2 to about 10 percent of the total cycle time.

* * * * *